May 21, 1963 S. P. CRANE 3,090,147
ELECTRICALLY INSULATED FRINGE FINGERS FOR MAKING
CHRISTMAS TREE BRANCHES AND METHOD
Filed Nov. 18, 1960 2 Sheets-Sheet 1

INVENTOR.
Samuel P. Crane
BY Harry Jacobson
ATTORNEY

May 21, 1963    S. P. CRANE    3,090,147
ELECTRICALLY INSULATED FRINGE FINGERS FOR MAKING
CHRISTMAS TREE BRANCHES AND METHOD
Filed Nov. 18, 1960    2 Sheets-Sheet 2
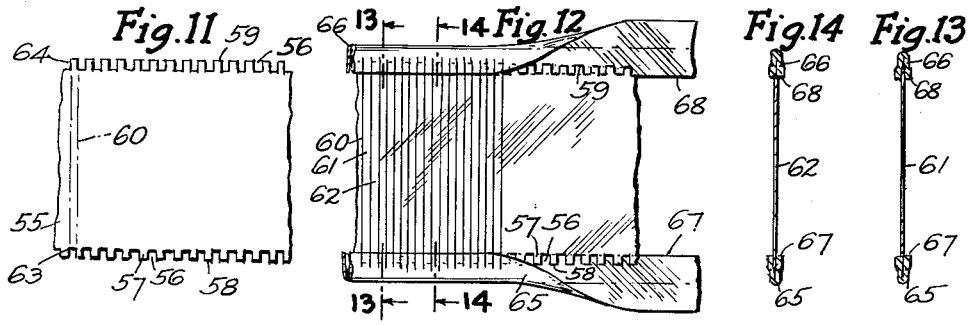
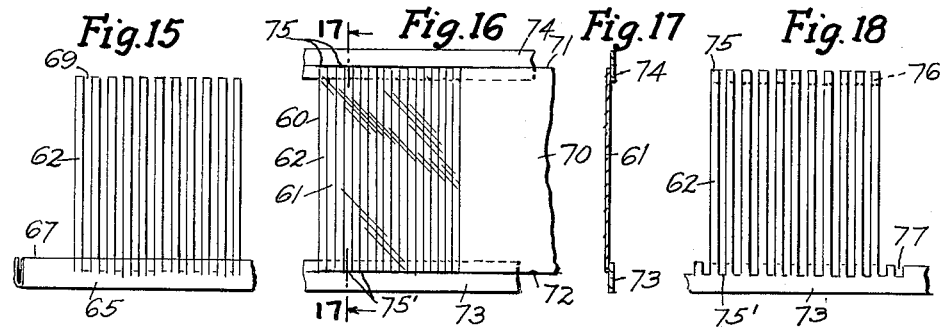
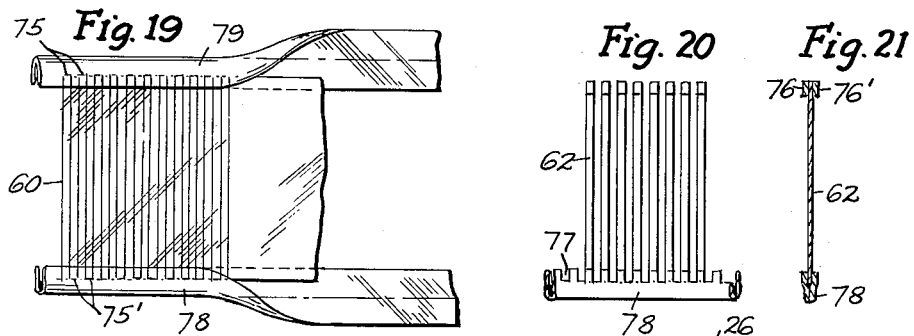
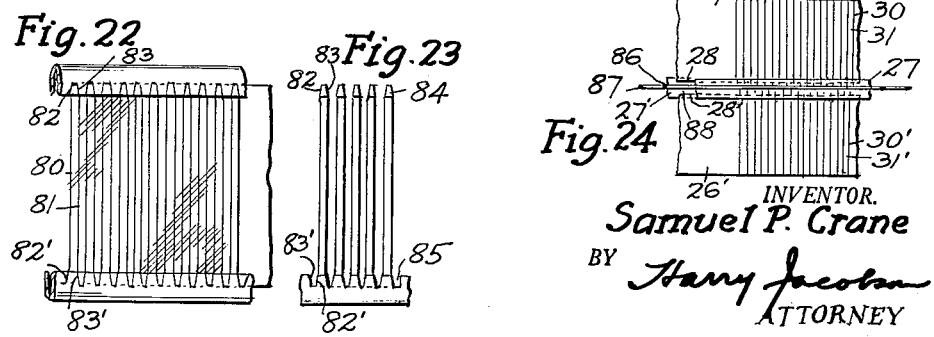
INVENTOR.
Samuel P. Crane
BY Harry Jacobson
ATTORNEY

United States Patent Office 3,090,147
Patented May 21, 1963

3,090,147
ELECTRICALLY INSULATED FRINGE FINGERS FOR MAKING CHRISTMAS TREE BRANCHES AND METHOD
Samuel P. Crane, 1 Warwick Road, Great Neck, N.Y.
Filed Nov. 18, 1960, Ser. No. 70,165
12 Claims. (Cl. 41—15)

This invention relates to decorative fringes and particularly to the metallic foil type used in making the branches of artificial Christmas trees.

There have been instances of electric shock and injury to those touching artificial trees where short circuits have occurred in the electric light wiring. The metallic foil fringes heretofore wound helically on elongated supports to imitate the needles on the tree branches are electrically connected and conduct the current throughout the branch when such short circuit occurs. The entire branch in such case constitutes a potential hazard.

The present invention contemplates the provision of a metallic foil decorative fringe wherein the individual fingers have insulating material of the same width as the finger on at least one face thereof and on at least one end thereof and are devoid of electrical connection with adjacent or other fingers and the danger of electrical shock is thereby minimized or eliminated.

The invention further contemplates the provision of a simple and economical composite fringe in which metallic foil is completely cut up transversely into individual but similarly shaped electrically disconnected fingers unattached to each other except by a continuous separate edge strip of flexible insulating material having relatively short fringe fingers secured to the end portions of the foil fingers and which can be helically wound on a suitable base or on itself to form a tree branch.

The invention further contemplates the provision of a simple method of making the fringe with individual electrically disconnected fingers, comprising attaching a transverse projecting insulating strip to and along a side edge portion of a metallic foil strip and cutting by suitable cuts transversely through the foil and through part only of the attached insulating strip to leave an uncut longitudinal finger-connecting peripheral part or spine on the insulating strip.

In my prior application Serial No. 38,941, now Patent No. 3,056,223, is disclosed a fringe made of separated foil finger sections each one or more fingers formed by cuts terminating at a point spaced inwardly from an edge of the fringe, the fingers being held together by the unsevered part of the foil strip itself. The finger sections are there shown as held together by a continuous and unbroken and uncut but stretchable insulating section-connecting edge strip. Said prior application discloses also a method of making such fringe. In the present invention, the fingers themselves are electrically disconnected by finger-forming cuts extending transversely completely across the foil strip into the insulating strip to increase the effective length of the foil fingers, no unsevered edge part of such foil strip being retained, whereby any short circuit is necessarily confined to the particular finger or fingers of the fringe making direct contact with the electrical conductor and the current cannot pass from such finger into any other part of the fringe.

In carrying out the invention, the fingers are optionally separated either by mere transverse slits in the foil strip extending into the insulating strip or by suitably shaped material-removing cuts forming two similar fringes simultaneously, thereby to space the fingers longitudinally apart a distance equal to the width of a finger, as will later be described in detail.

The various objects of the invention will be clear from the description which follows and from the drawings, in which FIG. 1 is a top plan view, partly in section, of a tree branch in which a single turn of the fringe has been wound, the thickness of the fingers having been exaggerated for clarity.

FIG. 11 is an elevational view of a metallic foil strip having notched edges and useful in making the fringe of FIGS. 12–15.

FIG. 12 is an elevational view of the partly completed double fringe formed by enclosing both edges of the notched foil strip with insulating strips and making straight transverse cuts across the foil strip and part way into each of the insulating strips.

FIG. 13 is a vertical sectional view of the double fringe before the separation thereof into individual fringes, the view being taken on the line 13—13 of FIG. 12.

FIG. 14 is a similar view of the same taken on the line 14—14 of FIG. 12.

FIG. 15 is an elevational view of one of the two finished fringes resulting from the transverse cuts of FIG. 12.

FIG. 16 is a similar view of a double fringe formed by suitable cuts passing through the foil strip and through parts of the edge strips, the insulating strips being each of a single thickness and not folded.

FIG. 17 is a vertical sectional view of the same taken on the line 17—17 of FIG. 16.

FIG. 18 is an elevational view of the finished separated fringe of FIG. 16.

FIG. 19 is a view similar to FIG. 12 of a fringe in which the insulating edge strips have been folded onto both faces of the foil strip, and finger-forming cuts made as in FIG. 16.

FIG. 20 is an elevational view of the separated fringe of FIG. 19.

FIG. 21 is a vertical sectional view of the fringe of FIG. 20 taken through one of the fingers.

FIG. 22 is an elevational view similar to FIGS. 16 and 19 but showing non-parallel cuts.

FIG. 23 is a similar view of one of the fringes of FIG. 22 as it appears when separated from the other.

FIG. 24 is a similar view of an insulated fringe employing a wire core.

Figure 1:
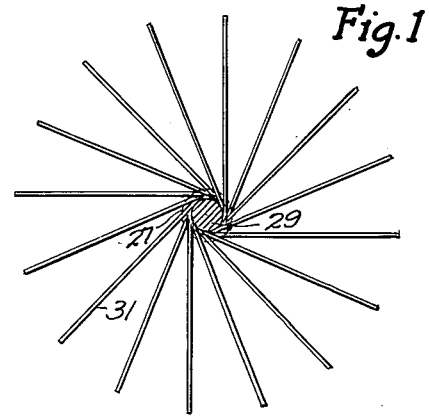
Figure 3:
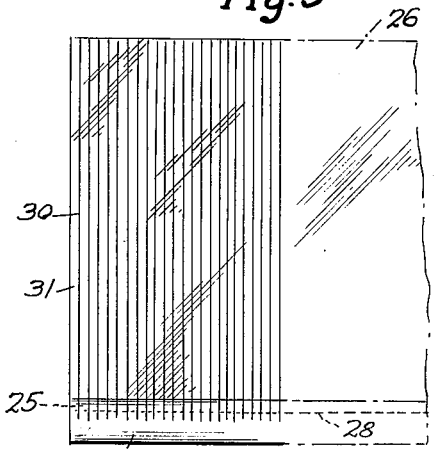
FIG. 3 is a fragmentary elevational view of the flat fringe showing the finger forming cuts extending into the insulating strip and past the secured end edges of the fingers.
Figure 4:
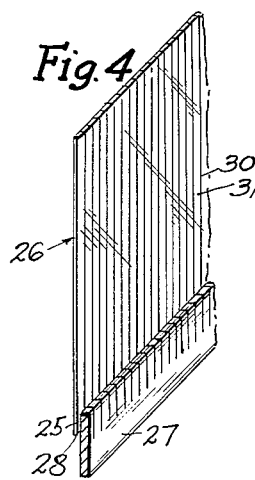
FIG. 4 is a perspective view of FIG. 3.

Referring now to that form of the invention shown in FIGS. 1–4, one side edge portion 25 of the usual aluminum foil strip 26 is attached to an insulating connecting strip 27 by any suitable means such as adhesive. Pressure sensitive adhesive tape of the plastic type is quite suitable for the strip 27. Said strip projects transversely outwardly past the side edge 28 of the foil strip or end edge of the foil finger, a sufficient distance to permit the assembly of the two strips 26 and 27 to be properly wound on itself or on the core member 29 (FIGS. 1–2) to form a tree branch. When the insulating strip is of the type which is coated with pressure sensitive adhesive, the projecting portion thereof which does not overlap the foil strip is quickly attached, as by mere tight winding, to the core member, or to the previous turn of itself if the strip is wide enough.

The transverse parallel cuts 30, which cut the fringe into fingers 31, do not terminate inwardly of the foil edge 28 as is customary and as is shown in the above identified pending application, but the cuts continue completely across the foil member and preferably somewhat past the edge 28. Such cuts or slits therefore extend part way across the width of the insulating strip 27 to form insulating fringe fingers and electrically disconnect from each other the metallic fringe fingers 31 thus formed.

Figure 2:
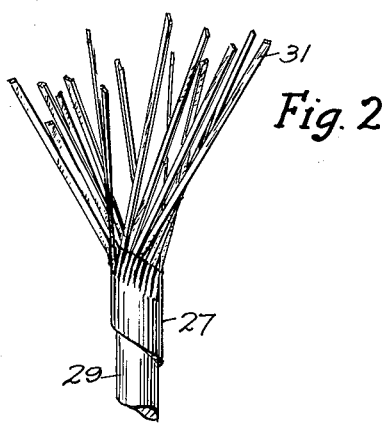
FIG. 2 is a fragmentary elevational view of one form of the fringe showing the transverse cuts part way into the insulating strip and showing how the fingers separate on a single turn of the fringe.

Whether or not the cuts extend past the foil edge 28, the fingers become separated somewhat at the bases thereof up to the outer ends of the cuts 30, as suggested by FIG. 2 when the fringe is helically wound on the core 29, or when it is wound on itself as shown in said copending application. An air gap is thereby formed between the fingers, at the bases thereof as well as along the entire lengths of the adjacent edges of the fingers. Such gaps may of course, be increased to the extent desired at the finger bases by extending the cuts 30 further into the insulating strip to increase the length of the composite end portion of the complete composite fringe finger.

The foil strip, the insulating strip, the attaching means for said strips, the cuts and the fingers formed by the cuts may take a considerable variety of different forms and arrangements. A few more of such typical forms and arrangements have been illustrated in FIGS. 5–23 and will now be described, together with the method of making the fringe.

Figure 5:
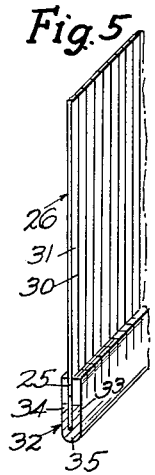
FIG. 5 is a perspective view of a modified form of the fringe in which the insulating strip is folded around and embraces the ends of the fingers.

In FIG. 5, the insulating strip 32 is shown folded around and embracing the side edge portion 25 of the foil member to form two thicknesses 33 and 34 joined by the bend 35. The cuts 30 pass through or are laterally aligned in both thicknesses. The fingers 31 are adhesively or otherwise attached on the respective faces thereof to the thicknesses 33 and 34 and are thereby more securely anchored against undesired removal from the finished fringe than is possible with the strip 27 of a single thickness shown in FIG. 4.

Figures 6, 7, 8:
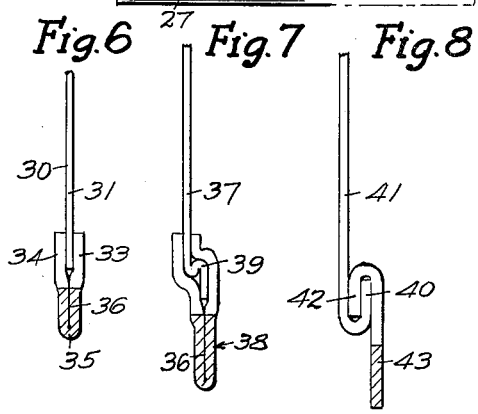
FIG. 6 is a vertical sectional view of another form of the fringe in which the folded transversely projecting thicknesses of the insulating strip are secured together.
FIG. 7 is a similar view of another modified form of the fringe in which the fingers and the insulating strip are folded back or pleated to resist withdrawal of the fingers from the anchorage thereof in the insulating strip.
FIG. 8 is a similar view of another form of the fringe in which the bases of the fingers and the edge of the insulating strip are hooked and interlocked for better anchorage.

The fringe of FIG. 6 is similar to that of FIG. 5 except that the outer or extended parts of the thicknesses 33 and 34, that is, the parts which do not overlap the bases of the fingers, are brought into face to face contact with each other and cemented, heat-sealed or otherwise fastened together as at 36 to strengthen the strip and to improve the anchorage thereof and to resist possibility of movement of the bases of the fingers relatively to the strip or loosening of the fingers and ultimate detachment thereof.

In FIG. 7, the base of each finger 37 is kinked, creased or folded as at 39 to form an increased thickness or deformation resisting withdrawal of the finger from the attached covering insulating strip 38 and providing a better anchorage for the finger than is possible without such deformation and with adhesive alone. The finger-forming cuts pass as before completely across the entire foil member and through the adjacent thicknesses of the insulating strip. The non-overlapping parts or uncut projecting parts of the thicknesses are secured together as by heat sealing or adhesive or the like.

In the form of the fringe shown in FIG. 8, the edge portion 40 of the foil strip 41 is folded inwardly or made hook-shaped and is attached to and interlocked with the similarly folded edge portion 42 of the insulating strip 43 to anchor the cut fingers to the strip 43 in a simple and economical manner. The transverse finger-forming cuts pass through the foil strip and through the folded and interlocked parts of both strips in the manner previously described in connection with the other forms of connecting insulating strips.

Figure 9:
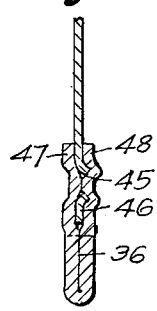
FIG. 9 is a vertical sectional view of another form of the strip in which each finger is perforated sufficiently to permit both flaps of the folded insulating strip to project into the perforation and into contact with each other and to be heat-sealed together.

In another form of anchorage for the fringe fingers as shown in FIG. 9, a series of holes 45 of any suitable outline but preferably elongated transversely of the foil strip, are made through the side edge portion 46 of said strip at intervals corresponding to the width of the fringe fingers. The transverse finger-severing cuts between the holes, pass through both thicknesses 47 and 48 of the inner edge portion of the folded insulating strip and preferably extend, in the same manner as previously explained, past the edge of the foil strip. However, this form of the anchorage for the fingers differs from that of FIG. 6 in that parts of the thicknesses 47 and 48 of the insulating strip pass through the holes 45 into face to face contact and are there secured together in the same manner as at 36 of FIGS. 6 and 7.

Figure 10:
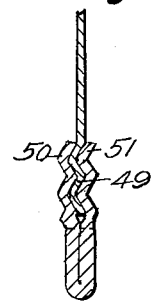
FIG. 10 is a similar view of still another form of the finger anchoring means, in which the insulating strip and the bases of the fingers enclosed therein are corrugated for anchorage purposes.

The finger anchorage of FIG. 10 differs from that of FIG. 6 in that the edge portion 49 of the fringe finger base, as well as the adjacent thicknesses 50 and 51 of the folded insulating strip, are corrugated to resist accidental withdrawal of the fingers from the insulating strip. In any case, said insulating strip is preferably anchored by means of adhesive or the like to the foil strip whether a shaped or adhered anchorage is employed or not.

As has been indicated, the shapes of the foil strip and of the finger-forming cuts may be considerably varied. Some examples of such variations are given additionally in the fringe forms of FIGS. 11–23, which are particularly useful where a relatively wide space between fringe fingers is advantageous. Referring to that form of the invention shown in FIGS. 11–15, the edges of the foil strip 55 are notched, preferably by rectangular notches 56 to form rectangular projections 57 of the same width and depth as the notches. The projection 57 at one edge of 58 of the foil strip is opposite and aligned with a notch 56 on the opposite edge 59. To enable the straight parallel transverse severing cuts 60 to separate the fringe fingers 61 of one fringe from each other and at the same time to form the fingers 62 of a second interdigital fringe, the right hand edge 63, as viewed in FIG. 11, of a projection on the lower foil edge 58 is aligned with the left hand edge 64 of a projection on the upper foil edge 59. One cut 60 is also aligned with and is superimposed upon said edges 63 and 64, thereby passing through both of the insulating edge strips 65 and 66 to a point at or just beyond the foil edges 58 and 59. The next cut is similarly superimposed upon the left hand edge of the next projection on the edge 58 and upon the right hand edge of the next projection on the edge 59, the width of the projections determining the width of the fingers.

With the foil strip notched as described, one set of fingers as 61, FIG. 13, have their free lower ends terminating at the inner edge 67 of, and are free of, the lower insulating strip 65, while the other set of fingers 62 have their free end edges at the inner edge 68 of the upper insulating strip 66. The cuts 60 are therefore sufficient to form two identical fringes simultaneously from the same foil strip, each fringe having fingers as 62 separated by a space 69 which is initially occupied in the foil strip by the fingers as 61 of the other fringe, and each having the corresponding ends of the fingers joined by an attached insulating strip as in those forms of the invention previously described. As best seen in FIGS. 13 and 14, where a notch initially occurred on either edge of the foil strip, the two thicknesses of the folded insulating strip are secured together to form a transverse edge pocket on each side of what was initially a projection 57 of the foil strip, the projections being attached to both thicknesses of the insulating strip, the attachment being of the adhesive type when a pressure sensitive insulating tape is used, or of a bonded type when heat sealing is used.

In the form of the invention shown in FIGS. 16–18, the foil strip 70 has straight continuous side edges 71 and 72 free of notches, and the insulating strips 73 and 74 are each of a single thickness of material and not folded. Mere straight transverse cuts are therefore insufficient to separate the assembled strips into two fringes. In this case, the cut comprises a set of two spaced apart short longitudinal cuts as well as a set of transverse cuts. A short longitudinal cut as 75 or 75' of each set is made at the extreme ends of alternate fingers 61 and 62 to free said ends from the foil strip preferably at or just beyond the edges of the foil strip and through the insulating strip only. A number of cuts may be made simultaneously along a considerable length of the assembled foil and insulating strips or a cutter making two successive transverse cuts and two opposite successive longitudinal cuts may operate successively, or progressively. The fingers of the completed fringe shown in FIG. 18 are tipped on one face with a superimposed tip 76 of the insulating strip cut out of said strip by the cuts 60 and 75 or 75' to leave a notch 77 in said strip between the bases of adjacent fingers. Since the insulating strips may be colored as desired and the foil strip also colored, the colors of the strips are so selected as to enhance the decorative effect presented, or if the tip is not to be emphasized, to minimize the effect thereof, as convenient.

Should a folded insulating strip be preferred as shown in FIGS. 19–21, the cuts 60, 75 and 75' are made in the same way as just described for the fringe of FIGS. 16–18. The folded insulating strips are notched as at 77 by such cuts, to produce tips 76, 76' on the respective faces of the free end portions of the fingers. The two fringes formed by such cuts are otherwise the same as in the form shown in FIGS. 16–18.

It has been indicated that the finger-severing cuts may take various shapes. In making either one or two fringes at a time, a sufficient space may be formed by suitably shaped cuts, between the bases of adjacent fingers to insure against electrical contact therebetween, especially where the fringe is wound in a helix of small pitch to form the branch, and the fingers do not stand out at a large obtuse angle on the branch. In making a single fringe as in FIGS. 3–6 with the desired spaces between the bases of the fingers, the material cut away from the bases of the fingers is discarded. In making a double fringe, the material removed from between the bases of adjacent fingers of one fringe, becomes the tip or free end of a finger of the other fringe, as will be seen from FIG. 22–23. In that form of the invention, each of the transverse severing cuts 80 and 81 is inclined or curved at its terminal portion in one direction as at 82, 82' respectively, and inclined in a different direction as at 83, 83' respectively at the other ends. Such cuts widen the bases of both sets of fingers to increase the area of adhesive contact between a finger and its insulating strip. The cuts also taper the free ends of the fingers. Obviously, curved cuts may be used to attain similar effects. The cuts being as in FIGS. 16 and 19, and the insulating strips being doubled, the fingers are tipped on both faces with tips as 84 of cut out pieces of insulating material, which cut-outs form notches 85 in the insulating strip.

FIG. 24 shows the invention applied to the twisted wire type of fringe core, wherein one wire as 86 is placed longitudinally on one face of the fringe strip and a second longitudinal wire is arranged on the opposite face, the wires being later twisted thereby to form the branch. Such twisted wire core is shown for example in the Schneider Patent No. 1,680,303 to which reference is made. However, instead of employing a single strip of slitted foil with a central uncut portion, two initially independent strips 26 and 26' are spaced transversely apart sufficiently to provide the longitudinal space 88 and thereby to insure against possibility of electrical contact therebetween.

The inner or base portions of the foil strips are connected by the insulating strips 27 and 27' projecting past the respective inner edges 28 and 28' and bridging the space 88 between the foil strips and arranged on opposite faces of the foil strips. One strip as 27' may be omitted if desired, but if both are used, they may be heat-sealed or otherwise secured together at the space 88 similarly to the doubled insulating strips of FIGS. 6, 7, 9 and 10. The cuts 30 and 30' and the fringe fingers 31 and 31' are similar to those hereinbefore described in connection with FIGS. 1–6 and need not be again described in detail.

It will now be seen that the invention may be practically embodied in a variety of forms to produce economically a fringe insulated against the transmission of electric current, capable of producing a variety of decorative effects, of forming a hollow branch when wound on itself, or a solid core branch when wound on a solid core, or a twisted wire core branch, and adequately attaining the objects of the invention.

While certain specific forms of the invention have herein been shown and described, various obvious changes may be made therein without departing from the spirit of the invention defined in the appended claims.

I claim:
1. A composite decorative fringe comprising
  a flexible transversely slitted electrically insulating strip having
    a series of transverse cuts therein extending from one side edge of the strip toward the opposite side edge and forming an insulating fringe having separable insulating fringe fingers, each finger constituting the insulating material between a pair of said transverse cuts,
    the remaining part of the strip constituting a continuous spine, and
  a series of metallic foil fingers each having
    an end portion secured to and of the same width as and movable as a unit with a fringe finger of the insulating strip,
    the remainder of each foil finger constituting a metallic extension of the insulating fringe finger and being bendable therewith as a unit to form a complete composite finger longer than the metallic extension and having a total length consisting of the combined lengths of the metallic extension and the insulating fringe finger.

2. The fringe of claim 1, the fringe fingers of the insulating strip extending past the extreme end edges of the secured end portions of the foil fingers and thereby providing a non-metallic insulating base portion on the complete composite finger free of foil and movable laterally out of the plane of the continuous spine.

3. The fringe of claim 1, there being an empty gap free of fringe material between the transverse edges of each pair of adjacent composite fingers, said gap being substantially as wide as the width of a finger and extending into the insulating strip between selected adjacent transverse cuts.

4. The fringe of claim 1, there being an empty gap between each pair of adjacent composite fingers, the gap extending throughout the entire lengths of the composite fingers, each composite finger having a free end, and
  a relatively short tip of insulating material on a face of and constituting a lamina of said free end, the tip being of a color other than that of the foil finger carrying said tip.

5. The fringe of claim 1, the strip providing a thickness of insulating material on each face of the secured end portion of each foil finger, the fingers of the insulating fringe of one thickness registering with the corresponding fingers of the insulating fringe of the other thickness, the spines of the thickness being secured together, and means anchoring the secured end portions of the foil fingers in between said thicknesses.

6. The fringe of claim 5, the thicknesses of the strip being connected by an integral fold at said opposite side edge of the strip, the secured end portions of the foil fingers being perforated, and the anchoring means comprising portions of each thickness at and entering the perforations of said end portions being secured to the other of the thicknesses.

7. A double composite decorative fringe which can be separated into two like portions comprising a first composite fringe according to claim 1 constituting one of said portions, the adjacent foil fingers of said first fringe being separated by the width of a finger to form spaces for the reception of the foil fingers of the other of said portions, and a second composite fringe according to claim 1 in reversed position relatively to and completely removable from the first fringe and having foil fingers in the spaces of the first fringe whereby the fingers of the first and second fringes are interdigitated but independently usable on the separation thereof, the insulating strips of the first and second fringes being on opposite edges of the double fringe, the transverse cuts in each strip which form the insulating fringe being in transverse alignment with the respective cuts which form the insulating fringe of the other strip, there being relatively short longitudinally aligned cuts at one end of each of said spaces to form the ends of the composite fingers, the short cuts of one strip alternating and being transversely opposite an insulating fringe finger of the opposite strip.

8. A composite decorative fringe comprising a flexible electrically insulating strip having a series of longitudinally spaced apart transverse cuts therein extending from one side edge of the strip toward the opposite side edge and forming a relatively short insulating fringe having adjoining fringe fingers along the length of said one side edge part of the strip, the remaining part of the strip constituting an unbroken continuous spine, and a series of independent metallic foil fingers each arranged between a pair of adjacent cuts extending across the entire width of a foil strip and registering with the corresponding transverse cuts of the insulating strip and each having an end portion thereof secured to a fringe finger of the insulating strip, each foil finger outstanding from and being bendable as a unit with and constituting a metallic lengthening extension of an insulating fringe finger and an incomplete finger of composite fringe, and forming with the insulating fringe finger a complete composite finger longer than the metallic lengthening extension alone, and adapted to be electrically and physically separated laterally from the adjacent composite fingers up to the unbroken spine when the composite fringe is twisted, and the insulating fringe fingers moved into spaced relation to and out of the normal plane of the spine.

9. The method of making an electrically insulated composite fringe having composite fingers of metal foil and of insulating material, for use in making the branch of an artificial tree, said method comprising attaching one side edge portion of an elongated insulating strip to and in overlapping relation to one side edge portion of a continuous unbroken metallic foil strip to leave the opposite side edge portion of the insulating strip free and unattached and to form the transversely projecting spine of the composite fringe, thereafter making transverse cuts throughout the entire width of the foil strip and simultaneously completely through the attached side edge portion of the insulating strip to separate the foil strip into individual independent fingers and simultaneously to form a relatively short fringe having insulating fingers from the attached side edge portion of the insulating strip, thereby to produce composite fringe fingers having a face of one end portion thereof covered with an insulating fringe finger and laterally movable up to the unbroken spine and for a finger length not less than the entire width of the foil strip.

10. The fringe forming method of claim 9, similarly attaching a second similar insulating strip to the opposite side edge portion of the foil strip, and elongating the transverse cuts so that said cuts pass the inner side edge of the second strip and also pass through and across the attached side edge portion of said second strip to slit said second strip and to form a second insulating fringe with the insulating fingers thereof attached to a face of the opposite end portions of the respective foil fingers.

11. The fringe forming method of claim 10, and notching the edge portions of the foil strip with notches of the width of the foil fingers and of at least the length of the insulating fringe fingers before making said transverse cuts, and before the attachment of the insulating strip to the foil strip.

12. The fringe forming method of claim 10, and making longitudinally aligned and longitudinally extending cuts adjacent the extreme end edges of the foil fingers between successive pairs of transverse cuts forming the insulating fringe fingers and through the insulating strip, the longitudinal cuts through one of the insulating strips alternating transversely with the longitudinal cuts between the pairs of transverse cuts of the other insulating strip at said opposite side edge portion.

References Cited in the file of this patent

UNITED STATES PATENTS 3,056,223    Crane _____ Oct. 2, 1962

FOREIGN PATENTS 266,907    Switzerland _____ May 16, 1950